(12) United States Patent
Dubey et al.

(10) Patent No.: US 11,548,976 B2
(45) Date of Patent: Jan. 10, 2023

(54) GLYCIDYL AMINE EPOXY RESINS BASED ON AMES NEGATIVE AMINES

(71) Applicant: ADITYA BIRLA CHEMICALS (THAILAND) LIMITED, Rayong (TH)

(72) Inventors: Pradip Kumar Dubey, Rayong (TH); Alok Khullar, Rayong (TH); Daniel Suckley, Rayong (TH); Thipa Naiyawat, Rayong (TH); Nok Noiphom, Rayong (TH); Dapawan Kunwong, Rayong (TH); Patcharin Samuthsen, Rayong (TH); Worakan Chamongkolpradit, Rayong (TH); Suphansa Noghan, Rayong (TH); Nalintip Changsarn, Rayong (TH)

(73) Assignee: Aditya Birla Chemicals (Thailand) Limited, Rayong (TH)

( * ) Notice: Subject to any disclaimer, the term of this patent is extended or adjusted under 35 U.S.C. 154(b) by 0 days.

(21) Appl. No.: 16/634,504

(22) PCT Filed: Oct. 17, 2018

(86) PCT No.: PCT/IB2018/058056
§ 371 (c)(1),
(2) Date: Jan. 27, 2020

(87) PCT Pub. No.: WO2019/077523
PCT Pub. Date: Apr. 25, 2019

(65) Prior Publication Data
US 2020/0239624 A1    Jul. 30, 2020

(30) Foreign Application Priority Data
Oct. 17, 2017   (IN) .............. 201711036901

(51) Int. Cl.
| | |
|---|---|
| *C08G 59/10* | (2006.01) |
| *C08G 59/06* | (2006.01) |
| *C08G 59/32* | (2006.01) |
| *C08G 65/26* | (2006.01) |
| *C09D 163/00* | (2006.01) |
| *C08G 59/28* | (2006.01) |
| *C08G 59/50* | (2006.01) |
| *C08G 59/62* | (2006.01) |

(52) U.S. Cl.
CPC .......... *C08G 59/10* (2013.01); *C08G 59/066* (2013.01); *C08G 59/3227* (2013.01); *C08G 65/2624* (2013.01); *C09D 163/00* (2013.01)

(58) Field of Classification Search
None
See application file for complete search history.

(56) References Cited

U.S. PATENT DOCUMENTS

| | | | | |
|---|---|---|---|---|
| 2,884,406 | A * | 4/1959 | Frank | .............. C08G 59/226 |
| | | | | 528/93 |
| 3,538,039 | A | 11/1970 | Lantz et al. | |
| 4,861,810 | A | 8/1989 | Dewhirst | |
| 4,886,867 | A * | 12/1989 | Lin | .............. C08G 59/10 |
| | | | | 528/111 |
| 4,978,791 | A | 12/1990 | Voelker et al. | |
| 5,977,286 | A | 11/1999 | Marten et al. | |
| 6,329,473 | B1 | 12/2001 | Marten et al. | |
| 2017/0096521 | A1 | 4/2017 | Niederst et al. | |

FOREIGN PATENT DOCUMENTS

| | | | |
|---|---|---|---|
| EP | 0496163 | 7/1992 | |
| EP | 0496163 A1 * | 7/1992 | .......... C08G 59/10 |
| GB | 816923 A * | 7/1959 | .......... C08G 59/3227 |
| JP | 2003/238658 | 8/2003 | |
| WO | WO 2016/203084 | 12/2016 | |
| WO | WO 2016/208344 | 12/2016 | |

OTHER PUBLICATIONS

International Search Report received in PCT/IB2018/058056 dated Feb. 15, 2019, 6 pages.
Written Opinion received in PCT/IB2018/058056 dated Feb. 15, 2019, 9 pages.

* cited by examiner

*Primary Examiner* — Randy P Gulakowski
*Assistant Examiner* — Ha S Nguyen
(74) *Attorney, Agent, or Firm* — Klarquist Sparkman, LLP

(57) ABSTRACT

A glycidyl amine epoxy resin(s) and a process for production of glycidyl amine epoxy resin(s) are disclosed. The glycidyl amine epoxy resin(s) is/are free from Bisphenol A (BPA) and Bisphenol F (BPF) and are based on AMES negative amine precursors.

7 Claims, No Drawings

GLYCIDYL AMINE EPOXY RESINS BASED ON AMES NEGATIVE AMINES

CROSS REFERENCE TO RELATED APPLICATIONS

This is the U.S. National Stage of International Application No. PCT/IB2018/058056 filed Oct. 17, 2018, which was published in English under PCT Article 21(2), which in turn claims the benefit of India Application No. 201711036901, filed in India on Oct. 17, 2017. Both applications are incorporated herein by reference in their entirety.

FIELD OF THE INVENTION

The present disclosure relates to an epoxy resin (s) and a process for production of epoxy resin(s). Specifically, the disclosure relates to epoxy resin(s) which is/are free from Bisphenol A (BPA) and Bisphenol F (BPF) and are based on AMES negative amine precursors.

BACKGROUND

Epoxy resins are a class of reactive prepolymers and polymers which contain more than one epoxide group. Epoxy resins are converted by reaction with suitable curing agents or by polymerization of epoxide groups into thermosets or cured epoxy resins. Epoxy resins are widely used in structural adhesives, casting resins, electrical laminates, coatings, 3D-Printing resins, and powder coating materials.

Epoxy resins also find application in various coating compositions in packaging industry especially in packaging of food and beverages, due to their excellent mechanical and chemical properties, such as high impact strength, high abrasion resistance, chemical resistance, and high electrical insulation capacity. When used in such packaging the general purpose of such coating systems is to protect metal surface from corrosion due to low pH conditions of variety of food products or ingredients such as soft drinks, tomato juice or beer. These protective coatings are also applied to the interior of food and beverage containers to prevent corrosion in the container headspace between the food products fill line and the container lid, which is particularly problematic with high salt content food products.

The majority of the epoxy resins that are used for coating applications are conventionally manufactured by using bisphenol like diglycidyl ether of Bisphenol A (BPA) or Bisphenol F (BPF), or the corresponding oligomers. However, the use of epoxy resins containing trace levels of free BPA or BPF is being considered as a suspected health hazard especially in food contact applications, thermal papers etc. This health concerns are mainly because BPA or BPF containing epoxy resins have are suspected to cause endocrine disruption and therefore fall in the category of substance of very high concern (SVHC). Although the scientific data available to date indicates that small trace amounts of these compounds that may be released from existing coatings do not pose any health risks to humans, these compounds are nevertheless perceived by the global regulatory food safety agencies as being potentially harmful to human health.

In light of these health concerns, manufacturers and food companies have now started showing interest in replacing BPA-based epoxy coatings with alternatives such as acrylic and polyester coatings. However, most of these alternative coatings are either more expensive than epoxy coatings or do not display the same array of characteristics performance properties with respect to their corrosion protection properties, hydrolytic stability to withstand retort conditions and applicability. Some of the alternative coatings also do not show high performance characteristics in terms of odor and leaching properties when compared to the coatings formulated with epoxy resin. As a result, they are not able to serve as functional replacements for the wide variety of products and processes for which epoxy coatings have been developed.

Amines and amine derivatives are the most diverse group of epoxy curing agents. Amine compounds were among the earliest reactants used with epoxy resins to produce useful products. Aromatic diamines are frequently used as coatings on surfaces subject to mechanical wear. These amines are one of the chemical classes in which the structural and molecular basis of carcinogenicity is most clearly understood. The evidence regarding the carcinogenic potential of amines in animals are available. The evidence in experimental animals has been crucial in the classification of some aromatic amines for their carcinogenicity to humans. Benzidine-based compounds and MOCA (4,4'-methylene bis-2-chloroaniline) were classified by the International Agency for Research on Cancer (IARC) as probable carcinogens based on strong evidence in animals.

Therefore, there is a need for an epoxy resin, coating compositions containing an epoxy resin which have excellent coating performance, but at the same time is completely free of BPA and BPF and are non-carcinogenic in nature. Such epoxy resins should be particularly useful in the coating containers such as those used in packaging of food and beverages.

SUMMARY OF THE INVENTION

The present disclosure relates to a glycidyl amine epoxy resin (s). A glycidyl amine epoxy resin of a structural Formula (II) obtained by reaction of a diamine of a structural Formula (I) with epichlorohydrin, wherein the structure of Formula (II) is represented by:

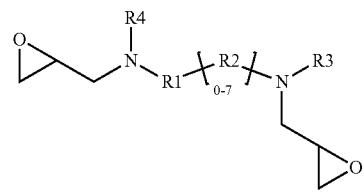

wherein the structure of diamine of the structural Formula (I) is represented by:

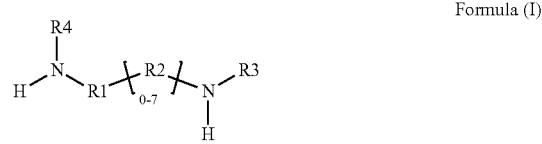

Formula (I)

wherein the
the diamine of formula (I) has at least two amine group with at least one labile hydrogen on each nitrogen;
at least one nitrogen atom is directly attached to an aromatic ring on one side;

at least 1 amine group is hindered amine either due to hindered aromatic ring having at least one substitution on ring at ortho position to carbon which is directly attached to amine group or due to branched aliphatic carbon directly attached to amine group;

at least one group out of R1, R2, R3 or R4 is independently hindered aromatic or branched aliphatic; substituted branched aliphatic;

R1, R2, R3, R4 independently can be hydrogen, alkyl, branched alkyl, aromatic, ortho substituted aromatic; Ar-aliphatic; substituted Ar aliphatic, substituted aliphatic R1 and R4, or, R2 and R3 may be connected; and wherein the diamine of structural Formula (I) is AMES negative.

The present disclosure also relates to a glycidyl amine epoxy resin of a structural Formula (III A) represented by:

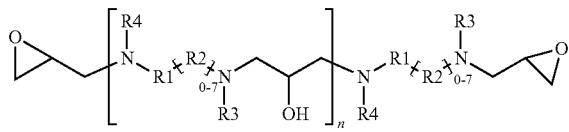

wherein
wherein
R1, R2, R3, R4 independently can be hydrogen, alkyl, branched alkyl, aromatic, ortho substituted aromatic; Ar-aliphatic; substituted Ar aliphatic, substituted aliphatic; and
n is 1 to 20 wherein Formula (III A) is obtained by the reaction of the glycidyl amine epoxy resin of Formula (II) with diamine of Formula (I);

wherein Formula (I) is

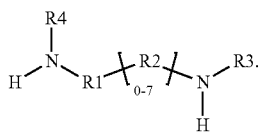

wherein
the diamine of formula (I) has at least two amine groups with at least 1 labile hydrogen on each nitrogen;

at least one nitrogen atom is directly attached to an aromatic ring on one side;

at least 1 amine group is hindered amine, either due to hindered aromatic ring having at least one substitution on ring at ortho position to carbon which is directly attached to amine group or due to branched aliphatic carbon directly attached to amine group;

at least one group out of R1, R2, R3 or R4 is independently hindered aromatic or branched aliphatic; substituted branched aliphatic;

R1, R2, R3, R4 independently can be hydrogen, alkyl, branched alkyl, aromatic, ortho substituted aromatic; Ar-aliphatic; substituted Ar aliphatic, substituted aliphatic;

R1 and R4, or, R2 and R3 may be connected;

wherein diamine of Formula I is Ames negative.

The present disclosure also relates to a glycidyl amine epoxy resin of a structural Formula (III B) represented by:

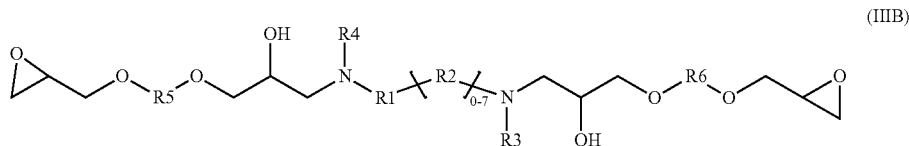

wherein Formula III B is a reaction product of the diamine of Formula (I) with a diglycidyl compound of Formula (IV) wherein R1, R2, R3, R4 independently can be hydrogen, alkyl, branched alkyl, aromatic, ortho substituted aromatic; Ar-aliphatic; substituted Ar aliphatic, substituted aliphatic; and R5 and R6 can be same or different; R5 and R6 are independently, C1-14 branched aliphatic alkyl; C1-14 unbranched aliphatic alkyl, cycloaliphatic, aromatic, substituted aromatic.

Q and A can be independently C (=O) O, O, NH wherein diamine of Formula I is Ames negative.

DETAILED DESCRIPTION OF THE INVENTION

For the purpose of promoting an understanding of the principles of the invention, reference will now be made to embodiments and specific language will be used to describe the same. It will nevertheless be understood that no limitation of the scope of the invention is thereby intended, such alterations and further modifications in the disclosed process, and such further applications of the principles of the invention therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The present disclosure relates to a glycidyl amine epoxy resin (s) and a process for production of said glycidyl amine epoxy resin.

In accordance with an embodiment, the glycidyl amine epoxy resin has a Formula (II).

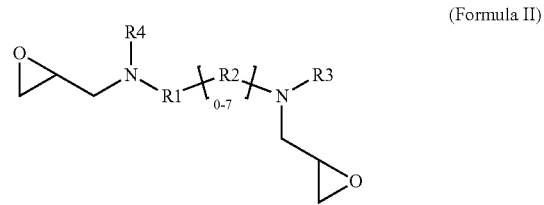

(Formula II)

wherein

R1, R2, R3, R4 independently can be hydrogen, alkyl, branched alkyl, aromatic, ortho substituted aromatic; ar-aliphatic; substituted ar aliphatic;

R1 and R4, or, R2 and R3 may be connected.

at least one group out of R1, R2, R3 or R4 is independently hindered aromatic or branched aliphatic; substituted branched aliphatic.

The glycidyl amine epoxy resin having the Formula (II) is a reaction product of epichlorohydrin with an AMES negative diamine of Formula (I).

In accordance with an embodiment, the diamine of the structural Formula (I) is represented by the structure:

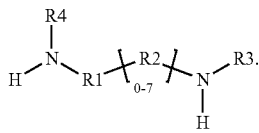

wherein the diamine of formula (I) is primarily AMES negative amine;

the diamine of formula (I) has at least two amine group with at least 1 labile hydrogen on each nitrogen;

at least one nitrogen atom is directly attached to an aromatic ring on one side;

at least 1 amine group is hindered amine, either due to hindered aromatic ring having at least one substitution on ring at ortho position to carbon which is directly attached to amine group or due to branched aliphatic carbon directly attached to amine group;

at least one group out of R1, R2, R3 or R4 is independently hindered aromatic or branched aliphatic; substituted branched aliphatic;

R1, R2, R3, R4 independently can be hydrogen, alkyl, branched alkyl, aromatic, ortho substituted aromatic; Ar-aliphatic; substituted Ar aliphatic, substituted aliphatic;

R1 and R4, or, R2 and R3 may be connected.

The glycidyl amine epoxy resin having the Formula (II) is free from Bisphenol A or Bisphenol F, as diamine of Formula (I) are free Bisphenol A/Bisphenol F precursors. The glycidyl amine epoxy resin of Formula (II) is also AMES negative, as the diamine of structural Formula (I) are derived from AMES negative diamine. The term "AMES negative" in context of the present disclosure means those amines which are non-carcinogenic in nature. Accordingly, to be AMES negative involves biological assay to assess the mutagenic or carcinogenic potential of the diamine. A negative test confirm that the diamine is non-carcinogenic and is safe for use.

In accordance with an embodiment, the diamine of the structural Formula (I) may be selected from the group comprising a compound of Formula (V), a compound of Formula (VI) or a compound of Formula (VII) represented by:

Formula (V)

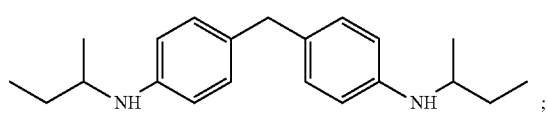

Formula (VI)

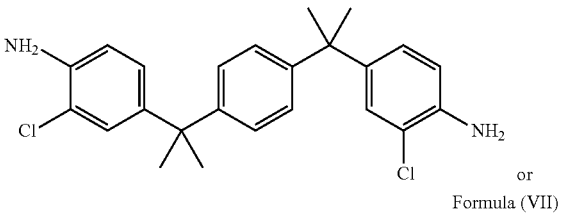

or

Formula (VII)

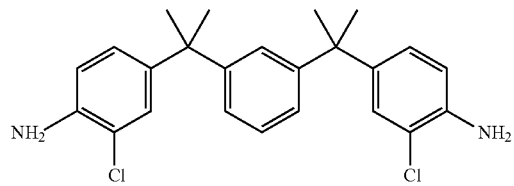

In accordance with an embodiment, the amine groups in the compound of Formula (V) is hindered due to branched aliphatic alkyl group directly connected to the amine group. The compound of Formula (VI) and the compound of Formula (VII) are hindered, either due to the ortho substitution on aromatic ring with respect to the position of carbon atom attached to the amine group.

In accordance with an embodiment, the diamine having Formula (V), Formula (VI), and Formula (VII), is epoxidized to form the glycidyl amine of Formula (IX), a glycidyl amine of Formula (X) and a glycidyl amine of Formula (X) and a glycidyl amine of Formula (XI) represented by:

Formula (IX)

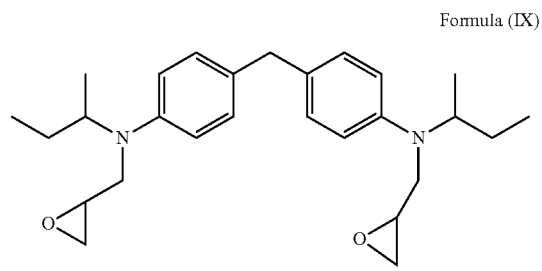

Formula (X)

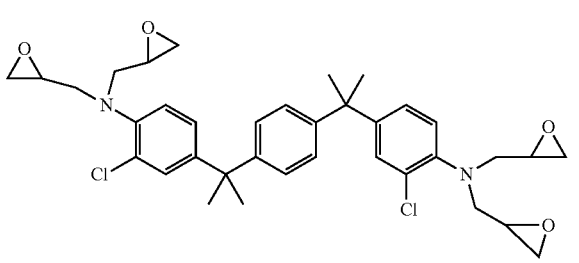

Formula (XI)

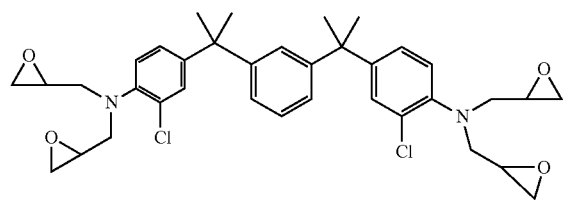

The process for preparing a glycidyl amine epoxy resin is also disclosed.

In accordance with an embodiment, the diamine of the structural Formula (I) is directly epoxidized with epichlorohydrin to prepare the glycidyl amine epoxy resin of Formula (II).

The process for producing the glycidyl amine epoxy resin having a Formula (II) comprising reacting epichlorohydrin with the compound selected from a group having Formula (I).

The reaction is as follows:

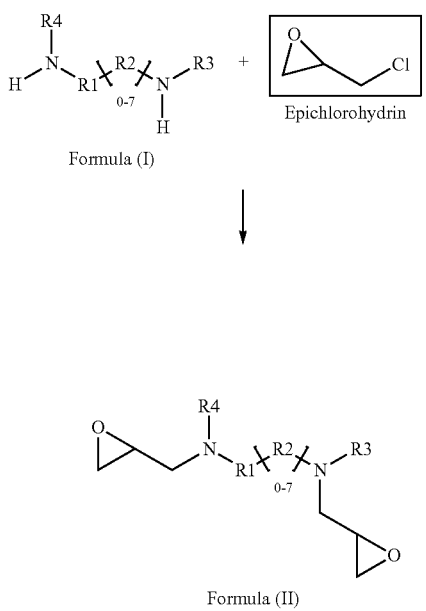

Formula (I)

Formula (II)

In accordance with an embodiment, the reaction produces a compound 4, 4'-Di (alkyl amino) diphenyl methane diglycidyl ether. In a specific embodiment the compound is a mixture of monomeric and oligomeric 4, 4'-Di (alkyl amino) diphenyl methane diglycidyl ether.

If an excess amount of epichlorohydrin is used, then greater is the fraction of monomeric 4, 4'-Di (alkyl amino) diphenyl methane diglycidyl ether. Further, monomeric 4,4'-Di(alkyl amino)diphenyl methane diglycidyl ether can be separated from oligomeric 4,4'-Di(alkyl amino)diphenyl methane diglycidyl ether by means of separation techniques. In accordance with an embodiment, the separation techniques include but are not limited to chromatography, extractive distillation.

In accordance with an alternate embodiment, the glycidyl amine epoxy resin has a Formula (III A)

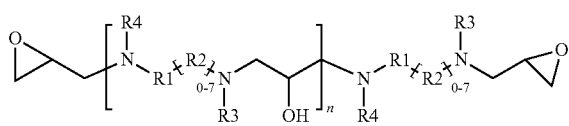

wherein

R1, R2, R3, R4 independently can be hydrogen, alkyl, branched alkyl, aromatic, ortho substituted aromatic; Ar-aliphatic; substituted Ar aliphatic, substituted aliphatic.

n=1 to 20

The glycidyl amine epoxy resin having the Formula (III A) is an oligomeric reaction product of the diamine of Formula (I) with the glycidyl amine of Formula (II).

In accordance with an embodiment, synthesis of epoxy resin of Formula (IIIA), is more specifically explained by way of examples in the present disclosure. By way of a specific example, the 4,4'-Di (alkyl amino) diphenyl methane diglycidyl ether-based polymers, is prepared by a fusion process in reaction of a monomeric or oligomeric 4,4'-Di (alkyl amino)diphenyl methane diglycidyl ether of the Formula (II) (n=0-2), with diamine of Formula (I) e.g. 4,4'-Di (alkyl amino) diphenyl methane as a chain extender to obtain a high molecular weight resin.

The epoxy resin having the Formula (III A) is also free from Bisphenol A, as neither the diamine of Formula (I) and nor the glycidyl amines of Formula (II) have free Bisphenol A or are synthesized from Bisphenol A precursor. These epoxy resin having the Formula (III A) are also derived from AMES negative diamine of Formula (I), as the diamine of Formula (I) are non-carcinogenic diamine.

The fusion reaction between the diamine of structural Formula (I) with the glycidyl amine of structural Formula (II) takes place in the presence of a catalyst. The catalyst is represented by the Formula (VII).

wherein $R_{10}$=Aryl, Aryl alkyl; Alkyl; Unsaturated Alkyl;

X=OH, COOH, H and

Y=COOH, SO3H.

In accordance with an embodiment, the catalyst is a mono or difunctional acidic catalyst.

In accordance with a specific embodiment, the catalyst is a di-substituted acidic catalyst.

In accordance with an embodiment, the acid dissociation constant value (pKa) of the catalyst is in the range of −3 to 5. In a preferred embodiment, the pKa value of catalyst is 2.97 to 4.6.

The catalyst may include but not limited to salicylic acid, oxalic acid, p-toluene sulphonic acid, oxalic acid and benzoic acid.

In accordance with an embodiment, the reaction may also take place in the absence of the catalyst.

The fusion reaction between the diamine of Formula (I) and the glycidyl amine of Formula (II) produces a mixture of monomeric and oligomeric products when the molar concentration of the glycidyl amine of Formula (II) is more than the diamine of Formula (I). In accordance with an embodiment, the EEW:AHEW of the glycidyl amine of Formula (II) to the diamine of Formula (I) is 1:1.14.

In accordance with an embodiment, the fusion reaction between the diamine of Formula (I) and the glycidyl amine of Formula (II) takes place at a temperature in the range of 50 to 200 ° C. In specific embodiment, the temperature is in the range of at 150 to 200° C.

The kinetics of the fusion reaction can be controlled by decreasing or increasing the quantity of mono-functional or di-functional acidic catalyst of Formula (VIII) between 0 to 1% by weight of the diamine of Formula (I).

In accordance with an alternate embodiment, the glycidyl amine epoxy resin has the Formula (III B). The epoxy resin having the Formula (III B) is a reaction product of the diamine of Formula (I) and a diglycidyl compound of Formula (IV).

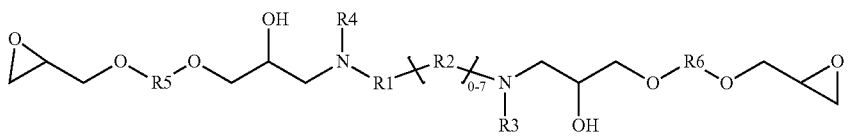

(Formula III B)

wherein

R1, R2, R3, R4 independently can be Hydrogen, Alky, branched alkyl, Aromatic, ortho substituted aromatic; Ar-aliphatic; substituted Ar Aliphatic;

R5 and R6 can be same or different; R5 and R6 are independently, C1-14 branched aliphatic alkyl; C1-14 unbranched aliphatic alkyl, cycloaliphatic, aromatic, substituted aromatic;

Q and A can be independently C(=O)O, O, NH wherein the diamine of formula I is AMES negative.

The glycidyl amine epoxy resin having the Formula (III B) is also free from Bisphenol A or Bisphenol F, as neither the glycidyl ether or ester of Formula (IV) nor the diamine of Formula (I) have Bisphenol A or Bisphenol F, or are synthesized from Bisphenol A or Bisphenol F precursor. These epoxy resin having the Formula (III B) is also derived from AMES negative diamine, as the diamine of Formula (I) are non-carcinogenic diamine.

In accordance with an embodiment, the diglycidyl compound of Formula (IV) includes any Bisphenol A Non-intent (BPA-NI) free diepoxy monomers. In a specific embodiment, the diglycidyl compound of Formula (IV) is a glycidyl ether, a glycidyl ester or a glycidyl amine. Examples of such BPA-NI epoxy monomers of Formula (IV) include but are not limited to any branched or unbranched, aliphatic or aromatic or araliphatic glycidyl ether or glycidyl ether with at least two epoxy groups.

Examples of such diglycidyl compound of Formula (IV) based on straight chain or branched aliphatic chain (C1-C34) include but are not limited to polypropyleneglycol glycidyl ether, neopentyl glycidyl ether, hexanediolglycidyl ether, cycloaliphatic rings e.g. hydrogenated bisphenols, hexahydrophthalic anhydride based glycidyl ester.

Examples of aromatic glycidyl ethers includes but are not limited to resorcinol glycidyl ether, biphenyl type glycidyl ethers, Examples of hindered aromatic glycidyl ethers or hindered araliphatic rings include but are not limited to tetramethyl bisphenols, glycidyl ester or glycidyl amines of Formula (II).

In a specific embodiment, the diglycidyl compound of Formula (IV) include but are not limited to a glycidyl ether of tetramethyl bisphenol F, a diglycidyl ether of ring-hydrogenated bisphenol A, a diglycidyl ether of ring-hydrogenated bisphenol F, cresol glycidyl ether resin, a novolac epoxy resin.

In accordance with an embodiment, the diglycidyl compound of Formula (IV) is a diglycidyl ether of Formula (IVA) or a diglycidyl ester of Formula (IVB) having at least two epoxy groups per molecule and are represented by:

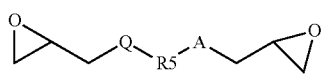

Formula (IVA)

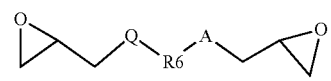

(Formula IVB)

wherein

R5 and R6 can be same or different; R5 and R6 are independently, C1-14 branched aliphatic alkyl; C1-14 unbranched aliphatic alkyl, cycloaliphatic, aromatic, substituted aromatic.

Q and A can be independently C(=O)O, O, NH

In accordance with an embodiment, the glycidyl amine epoxy resin having Formula (IIIA) and Formula (IIIB) may further include step-growth linkages, for example condensation linkages other than amine linkages. In These step-growth linkages may be in addition to, or in place of, the amine linkages. The step-growth linkages include amide linkages, carbonate linkages, ester linkages, urea linkages, urethane linkages, etc. In accordance with an embodiment, the epoxy resin having Formula (III) may include both amine and urea linkages. In some embodiments, the epoxy resin having Formula (III) does not include any condensation linkages or other step-growth linkages other than amine linkages.

The fusion reaction between the diamine of Formula (I) and the diglycidyl compound of Formula (IV) can be done by adding the diamine of Formula (I) either in single step or multiple steps to control the exotherm and increase in molecular weight.

In accordance with an embodiment, a sub stoichiometric amount of the diamine of Formula (I) is used with the diglycidyl compound of Formula (IV), to bring about an average of more than 1.9 epoxide group(s) per molecule in the epoxy resin in the resultant product having Formula (IIIB).

In accordance with an embodiment, the epoxy resin has a number average molecular weight ($M_n$) of at least 2,000 to 10000. In specific embodiment, the $M_n$ is at least 3,000 to 10000. In a more specific preferred embodiment, $M_n$ is at least 4000 to 8000. The $M_n$ of the epoxy resin may be as high as much as that is needed for the desired application. In accordance with an embodiment, the $M_n$ of epoxy resin may not exceed about 10000.

Curable Coating System:

The present disclosure further discloses a curable coating system comprising the glycidyl amine-based epoxy resin of Formula (IIIA) or Formula (IIIB).

In accordance with an embodiment, the curable coating system comprises the epoxy resin of Formula (IIIA) or Formula (IIIB), cured with a hardener. The curable coating system is BPA-NI type resin, as both the epoxy resin of Formula (IIIA) or Formula (IIIB) and the hardener of the curable coating system is free from bisphenols having estrogenic activity. The curable coating system is also precursors which are non-carcinogenic i.e., is "AMES negative" since the diamine used for preparing Formula (IIIA) or Formula (IIIB) as well as the hardener used in formulating a coating system is selected from the group consisting of "AMES negative" type amino curing agent or a "AMES negative" type phenolic resin.

In accordance with an embodiment, the epoxy resin of Formula (IIIA) or Formula (IIIB) is capable of forming a covalent linkage with functional group/s present on amino or phenolic type hardeners. In a specific embodiment, the hardener is a phenolic type harder.

In accordance with an embodiment, the ratio of Epoxy Equivalent Weight (EEW) to (Amine Hydrogen Equivalent Weight) AHEW may vary from 1 to 2. In a specific embodiment, the ratio is 1.1 to 1.18.

EXAMPLES

Synthesis of Low Molecular Weight Glycidyl Amine Epoxy Resin of Formula (II) Based on AMES Negative Diamine of Formula (I)

Example 1

Diglycidyl Ether of N,N'-Bis (Sec-Butyl Amino) Diphenyl Methane (IX)

N,N'-bis(sec-butyl amino) diphenyl methane (70 grams, 0.22 moles), epichlorohydrin (371.2 grams, 18 moles) and water (49 grams) were added in 1-L 4 neck flask fitted with condenser, a heater, a stirrer, and the thermometer. The reaction mixture was heated to 80° C. and under nitrogen atmosphere. Reaction temperature was maintained at 80° C. for 8 hours. Sodium hydroxide (32 grams, 0.40 moles) in water (32 ml) was added over a period of 30 minutes at 60° C., with simultaneous azeotropic removal of water. After complete sodium hydroxide addition, reaction was maintained at same temperature for 30 minutes. The water and excess epichlorohydrin were removed by evaporation at 70° C., under vacuum, from crude N,N'-bis (sec-butyl amino) diphenyl methane diglycidyl ether.

The crude was mixed with toluene (95 grams) and water (78 grams). Inorganic salt was removed. Solution was concentrated.

269.5 grams diglycidyl ether of N,N'-bis (sec-butyl amino) diphenyl methane with hydrolysable halogen content 6.2% was obtained. Product was further refined to achieve epoxy value of 0.322 equivalent weight per 100 grams with suitable hydrolysable halogen content with 91% yield.

Synthesis of Glycidyl Amine Epoxy Resins of Formula (IIIB) from the Fusion Reaction of BPA-NI Diglycidyl Compound of Formula (IV) with Diamine of Formula (I)

Example 2

Advancement of Diglycidyl Ether of Cyclohexane Dimethanol (CHDM DGE) with N,N'-Bis(Sec-Butyl Amino) Diphenyl Methane Polymer To a 4-neck round-bottomed flask equipped with a mechanical stirrer, a nitrogen inlet to maintain a nitrogen purging, condenser, a thermocouple and heating mantle was added 250 parts of cyclohexane dimethanol diglycidyl ether (CHDM DGE) (Epoxy value=0.617 eq/100 g), 124 parts of N,N'-bis(sec-butyl amino) diphenyl methane and 1.06 part of catalyst. This mixture was heated with stirring to 160° C., then heated at 160° C. for 4 hours until the epoxy value was 0.2 eq/100 g. At this 88.8 part of N,N'-bis (sec-butyl amino) diphenyl methane were added to the mixture while cooling the mixture to 130° C. This mixture was heated with stirring to 160° C., then heated at 160° C. for 4 hours. The batch was discharged at epoxy value=0.0393 eq/100 g and viscosity=257 centipoise at 25° C.

Example 3

The procedure of example 1 was repeated, except that quantity of was increased. Material was discharged at epoxy value=0.0327 eq/100 g, to get resin of high molecular weight.

Example 4

To a 4-neck round-bottom flask equipped with a mechanical stirrer, a nitrogen inlet, condenser, a thermocouple and heating mantle, was added 686.5 parts of cyclohexane dimethanol diglycidyl ether (CHDM DGE) (Epoxy value=0.617 eq/100 g), 481.2 parts of N,N'-bis(sec-butyl amino) diphenyl methane and 3.1 part of catalyst. This mixture was heated with stirring to 160° C., then maintained at 160° C. for 4 hours until the epoxy value was 0.1 eq/100 g. At this 132.3 part of N,N'-bis (sec-butyl amino) diphenyl methane were added to the mixture while cooling the mixture to 130° C. This mixture was heated with stirring to 170° C., then heated at 170° C. for 6 hours. The batch was discharged affording resin with epoxy value=0.0266 eq/100 g and viscosity=411.9 centipoise.

TABLE 1

Effect of N,N'-bis (sec-butyl amino) diphenyl methane: CHDMDGE ratio on Mn & Mw

|  | Exp. 2 | Exp. 3 | Exp. 4 |
| --- | --- | --- | --- |
| Ratio of CHDM DGE/MDBA (% by weight) | 54.02/45.98 | 53.77/46.23 | 52.81/47.19 |
| Catalyst (ppm on N,N'-bis(sec-butyl amino) diphenyl methane) | 5000 | 5000 | 5000 |
| CHDM DGE (g) | 250 | 400 | 686.5 |
| Diamine (N,N'-bis(sec-butyl amino) diphenyl methane) (MDBA) (g) | 212.8 | 344 | 613.5 |
| catalyst (g) | 1.06 | 1.7 | 3.1 |
| Product |  |  |  |
| EEW (g/eq) | 2544 | 3056 | 3753 |
| Softening point (° C.) | lump | 60.9 | 71.3 |
| Viscosity at 25° C. (cPs) | 257 | 301.9 | 411.9 |
| Mn | 2248 | 3074 | 2826 |
| Mw | 4263 | 6469 | 4905 |

Synthesis of Diglycidyl Ether of Hydrogenated Bisphenol A (HBPA DGE)/N,N'-Bis (Sec-Butyl Amino) Diphenyl Methane Polymer Example 5

To a 4-neck round-bottom flask equipped with a mechanical stirrer, a nitrogen inlet, condenser, a thermocouple and heating mantle, was added 300 parts of hydrogenated bisphenol A diglycidyl ether (HBPA DGE) (Epoxy value=0.448 eq/100 g), 88.8 parts of N,N'-bis(sec-butyl amino) diphenyl methane and 0.9 part of catalyst. This mixture was heated with stirring to 160° C., then heated at 160° C. for 2 to 3 hours until the epoxy value was 0.2 eq/100 g. At this point, 91.8 part of N,N'-bis (sec-butyl amino) diphenyl methane were added to the mixture while cooling the mixture to 130° C. This mixture was heated with stirring to 160° C., then heated at 160° C. for 6 hours. The batch was discharged affording epoxy value=0.042 eq/100 g and viscosity=407.9 centipoise.

Example 6

The procedure of example 4 was repeated, except increase in quantity of N,N'-bis (sec-butyl amino) diphenyl methane after Epoxy value=0.2 eq/100 g, to thereby get the resin with high molecular weight.

Example 7

To a 4-neck round-bottom flask equipped with a mechanical stirrer, a nitrogen inlet to maintain a nitrogen purging, condenser, a thermocouple and heating mantle was added 736.8 parts of hydrogenated bisphenol A diglycidyl ether (HBPA DGE) (Epoxy value=0.453 eq/100 g), 353.4 parts of N,N'-bis(sec-butyl amino) diphenyl methane and 2.4 part of catalyst. This mixture was heated with stirring to 160° C. for 8 hours until the epoxy value was 0.1 eq/100 g. At this point, 122 part of N,N'-bis (sec-butyl amino) diphenyl methane were added to the mixture while cooling the mixture to 130° C. This mixture was heated with stirring to 170° C. for 4 hours and after that temperature was raised to 180° C. for 4 hours. The batch was discharged at epoxy value=0.023 eq/100 g and viscosity=941.8 centipoise.

Data and results are summarized in Table 2.

TABLE 2

Synthesis of HBPA and N,N'-bis (sec-butyl amino) diphenyl methane based epoxy resins and reaction conditions

|  | Exp. 5 | Exp. 6 | Exp. 7 |
|---|---|---|---|
| Ratio of HBPA GE/MDBA (% by weight) | 62.42/37.58 | 62.14/37.86 | 60.71/39.29 |
| Catalyst Quantity on MDBA (ppm) | 5000 | 5000 | 5000 |
| HBPA GE (g) | 300 | 400 | 736.8 |
| N,N'-bis(sec-butyl amino) diphenyl methane (MDBA) (g) | 180.6 | 243.65 | 475.4 |
| catalyst (g) | 0.9 | 1.2 | 2.4 |
| Product |  |  |  |
| EEW (g/eq) | 2362 | 2707 | 4302 |
| Softening point (° C.) | 80.5 | 86.9 | 101 |
| Viscosity at 25° C. (cPs) | 407.9 | 569.9 | 941.8 |
| Mn | 2727 | 3155 | 3429 |
| MW | 4991 | 6125 | 6204 |

Example 8

To a 4-neck round-bottom flask equipped with a mechanical stirrer, a nitrogen inlet, condenser, a thermocouple and heating mantle was added 129.2 parts of cyclohexane dimethanol diglycidyl ether (CHDM DGE) (Epoxy value=0.617 eq/100 g), 110.1 parts of N,N'-bis(sec-butyl amino) diphenyl methane and 0.55 part of salicylic acid as a catalyst. This mixture was heated with stirring to 160° C., then heated at 160° C. for 7 hours. The batch was discharged to get resin with epoxy value=0.0393 eq/100 g.

Example 9

To a 4-neck round-bottom flask equipped with a mechanical stirrer, a nitrogen inlet to maintain a nitrogen purging, condenser, a thermocouple and heating mantle was added 129.2 parts of cyclohexane dimethanol diglycidyl ether (CHDM DGE) (Epoxy value=0.617 eq/100 g), 110.1 parts of N,N'-bis(sec-butyl amino) diphenyl methane. This mixture was heated with stirring to 160° C., then heated at 160° C. for 9 hours. The batch was discharged affording epoxy value=0.039 eq/100 g.

Example 10-13

The procedure of example 7 was repeated, only type of catalyst was changed at same molar ratio. The reaction time to reach set target epoxide equivalent weight was monitored to understand the effect of catalyst on reaction kinetics.

Data and results are summarized in Table 3.

TABLE 3

Synthesis of CHDM DGE and N, N'-bis (sec-butyl amino) diphenyl methane based glycidyl amine resins with different catalyst/s

|  | Exp. 7 | Exp. 8 | Exp. 9 | Exp. 10 | Exp. 11 | Exp. 12 | Exp. 13 |
|---|---|---|---|---|---|---|---|
| Ratio of CHDM DGE/MDBA (% by weight) | 54.02/45.98 | 54.02/45.98 | 54.02/45.98 | 54.01/45.98 | 54.02/45.98 | 54.02/45.93 | 54.02/45.98 |
| Catalyst | Salicytic acid | — | Benzoic acid | p-hydroxy benzoic acid | p-totuene sulfonic acid | Adipic acid | Oxatic acid |
| CHDM DGE (g) | 129.2 | 129.2 | 129.2 | 108.1 | 129.2 | 129.2 | 129.2 |
| N,N'-bis(sec-butyl, amino) diphenyl methane (MDBA) (g) | 110.1 | 110.1 | 110.1 | 92 | 110.1 | 110.1 | 110.1 |
| Catalyst (g) | 0.55 | — | 0.49. | 0.46 | 0.76 | 0.58 | 0.5 |
| Reaction time (hours) | 7 | 9 | 7 | 7 | 8.3 | 7 | 8 |
| Product |  |  |  |  |  |  |  |
| EEW (g/eq) | 2285 | 2542 | 2732 | 2704.7 | 2616 | 2614 | 2666 |
| Tg (° C.) | 26.91 | 27.23 | 22.76 | 28.57 | 34.74 | 28.4 | 27.62 |
| Mn | 2420 | 2370 | 2492 | 2549 | 2486 | 2560 | 2460 |
| Mw | 3941 | 3933 | 4278 | 4364 | 4428 | 4289 | 4302 |

Example 15

The procedure of example 9 was repeated with cyclohexane dimethanol diglycidyl ether of higher purity.

TABLE 4

Synthesis of Glycidyl amine based on High purity CHDM DGE and N,N'-bis (sec-butyl amino) diphenyl methane for High Mw glycidyl amines

|  | Exp 15 |
| --- | --- |
| Ratio of CHDM-DGE/MDBA (% by weight) | 49.18/50.82 |
| Purity of CHDM-DGE (%) | 88 |
| Catalyst | No |
| CHDM-DGE (g) | 120 |
| MDBA (g) | 124 |
| Catalyst (g) | — |
| Reaction time (hours) | 12 |
| Product |  |
| EEW (g/eq) | 2,384 |
| Mn | 3,510 |
| Mw | 6,191 |

Example 16-18

The procedure of example 15 was repeated with ratio of CHDM-DGE:MDBA adjusted at EEW/HEW=1 and cyclohexane dimethanol diglycidyl ether with different purities were used.

TABLE 5

|  | Exp 16 | Exp 17 | Exp 18 |
| --- | --- | --- | --- |
| Ratio of CHDM-DGE/MDBA | 45.86/54.14 | 45.58/54.42 | 45.28/54.72 |
| Purity of CHDM-DGE (%) | 90 | 96 | 98 |
| CHDM-DGE (g) | 615 | 161.6 | 150 |
| MDBA (g) | 726 | 192.9 | 181.3 |
| Reaction time (hours) | 16 | 21 | 13 |
| Product |  |  |  |
| EEW (g/eq) | ND | 13,178 | 22,593 |
| Mn | 3,044 | 6,968 | 5,921 |
| Mw | 11,394 | 29,015 | 24,135 |

Above glycidyl amine epoxy resin are based on either direct epoxidation of AMES negative diamine of Formula (I), or, they are reaction product of BPA.NI diglycidyl ether of Formula (IV) and AMES negative diamine of Formula (I).

BPA-NI diepoxy glycidyl ether defined here are neither derived bisphenol A and F precursors nor on bisphenol A and F glycidyl ethers.

Above novel epoxy resins can be used to formulate curable compositions with curing agents. Curing agents for the purposes of the invention are compounds suitable for producing crosslinking of resins of this new invention and ideally AMES negative, Reaction with curing agents can be used to convert polyepoxide compounds of current invention into infusible, three-dimensionally "crosslinked", thermoset materials.

Curing reactions were conducted with selective resins of this invention. Oligomers containing hydroxyl groups and aromatic contents in the range similar to a conventional "type 9" resins were synthesized and further evaluated for coating purpose on metal surface. Examples of such resins are oligomers produced from reaction of advancement of N,N'-bis (sec-butyl amino) diphenyl methane with cyclohexane dimethanol diglycidyl ether with diamines (I) as defined in current invention.

Experimental product, from advancement of cyclohexane dimethanol diglycidyl ether with N,N'-bis (sec-butyl amino) diphenyl methane (MDBA) was prepared as per procedure of example 9 and tested for performance properties as per can coating test protocol.

Example 19

Production of Coatings from Novel Epoxy Resin of Example 9

Oligomer from example 9, was used without further work-up as the epoxy resin for producing coatings from cured epoxy resin on tin plate.

Epoxy resin solution in methoxypropyl acetate (MPA) with 40% solids wt./wt. was prepared. The epoxy resin solutions were then mixed with a phenolic resin (Phenodur PR 516/60B Cytec Industries Inc.) as curing agent and with a phosphoric acid-based catalyst The proportions of the resin: hardener mixtures in weight on the overall mixture are compiled in table 6. The formulations mixtures were then applied by bar coater, 20 µm wire doctor, 80 mm/s drawing speed) onto the previously degreased substrate (E 2.8/2.8, a tinplate coated on both sides with 2.8 g of tin per $m^2$, as commonly used for the production of cans for foodstuffs).

The coatings were baked at 200° C. for 12 minutes. A dry film thickness of 5 to 6 µm was established. Baking on the galvanized steel sheet produced a golden yellow coloration of the coating, of the kind customary for interior can coatings (gold varnish).

For comparison, coating based on standard bisphenol A-based "type 9" epoxy resin (EPOTEC 909, EEW: 2500-2800 g/eq; from Aditya Biria Chemicals (Thailand) was used in similar manner and results were compared.

|  | Resin name | XY17 BPANI/AN | | | | |
| --- | --- | --- | --- | --- | --- | --- |
| Resin | EEW (g/eq) | 3,753 | 3,753 | 3,753 | 3,753 | 3.753 |
| Resin solution | Solvents/Ratio | Butyl cellusolve + Xylene 1:1 | Butyl cellusolve + Xylene 1:1 | Butyl cellusolve + Xylene 1:1 | Butyl cellusolve + Xylene 1:1 | Butyl cellusolve + Xylene 1:1 |
|  | % NV (~40%) | 39.5 | 39.5 | 39.2 | 39.4 | 39 |
| Formulation |  | Resin/croslinker ratio | | | | |
| Resin | Resin solution (g) | 50.52 | 50.52 | 43.8 | 43.8 | 37.07 |
| Cross linker | Cymel 659 (g) | 4.68 | 2.34 | 13.1 | 9.83 | 16.85 |
|  | Cymel 303LF (g) | 3.44 | 5.15 | — | 2.41 | — |
|  | Cymel 659: Cymel 303 LF | 50:50 | 25:75 | 100 | 75:25 | 100 |
| Catalyst | Catalyst | 1 | 1 | 1 | 1 | 1 |
| Solvent | DBE (g) | 41.16 | 41.78 | 42.92 | 43.79 | 45.93 |
| Properties | % NV | 23.51 | 23.59 | 23.62 | 23.28 | 22.56 |

-continued

| Resin name | | XY17 BPANI/AN | | | | |
|---|---|---|---|---|---|---|
| Resin | EEW (g/eq) | 3,753 | 3,753 | 3,753 | 3,753 | 3.753 |
| Coating | Substrate temperature (° C.)/ time (min) | Tin plate 200/10 | Tin plate 200/10 | Tin plate 200/10 | Tin plate 200/10 | Tin plate 200/10 |
| | Bar no | 3 | 3 | 3 | 3 | 3 |
| Testing | Film thickness (μm) | 13-15 | 13-15 | 13-15 | 13-15 | 13-15 |
| | MEK DR (times) | >100, >100) | >100, >100 | 12, 15 | >100, >100 | >100, >100 |
| | Adhension, cross cut (% remove) | 0, 0 | 0, 0 | 0, 0 | 0, 0 | 0, 0 |
| | Wedge bend (%) | 70, 71 | 65, 72 | 84, 88 | 68, 69 | 74, 75 |

Specific Embodiments are Disclosed Below:

A glycidyl amine epoxy resin of a structural Formula (II) obtained by reaction of a diamine of a structural Formula (I) with epichlorohydrin, wherein the structure of Formula (II) is represented by:

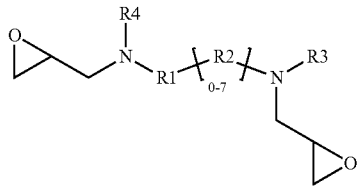

wherein the structure of diamine of the structural Formula (I) is represented by:

Formula (I)

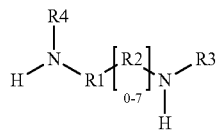

the diamine of formula (I) has at least two amine group with at least one labile hydrogen on each nitrogen;

at least one nitrogen atom is directly attached to an aromatic ring on one side;

at least 1 amine group is hindered amine;

either due to hindered aromatic ring having at least one substitution on ring at ortho position to carbon which is directly attached to amine group or due to branched aliphatic carbon directly attached to amine group;

at least one group out of R1, R2, R3 or R4 is independently hindered aromatic or branched aliphatic; substituted branched aliphatic;

R1, R2, R3, R4 independently can be hydrogen, alkyl, branched alkyl, aromatic, ortho substituted aromatic; Ar-aliphatic; substituted Ar aliphatic, substituted aliphatic;

R1 and R4, or, R2 and R3 may be connected; and wherein the diamine of structural Formula (I) is AMES negative.

Such glycidyl amine epoxy resin, wherein the diamine of structural Formula (I) is selected from a group comprising a compound of Formula (V), a compound of Formula (VI) or a compound of Formula (VI) represented by:

Formula (V)
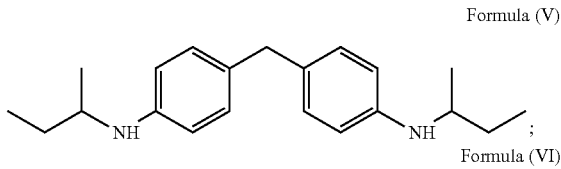

Formula (VI)
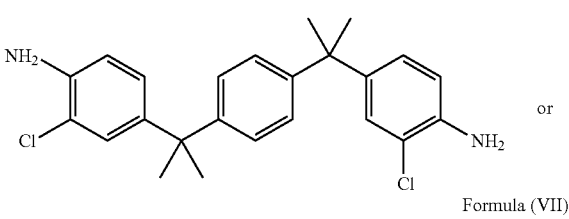

or

Formula (VII)
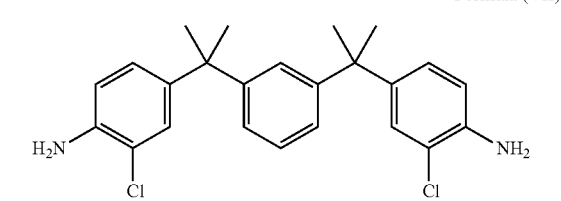

Such glycidyl amine epoxy resin, wherein the glycidyl amine epoxy resin of structural Formula (II) is selected from a group comprising a glycidyl amine of Formula (IX), a glycidyl amine of Formula (X), a glycidyl amine of Formula (XI) represented by:

Formula (IX)
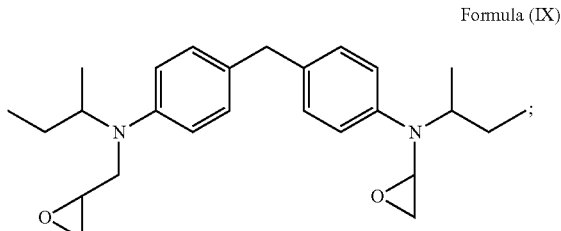

Formula (X)
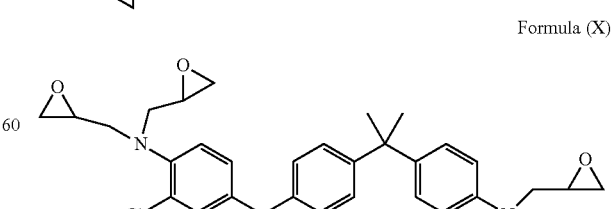

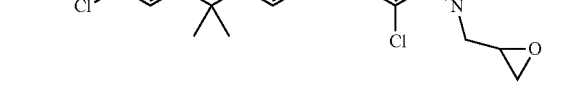

-continued

Formula (XI)

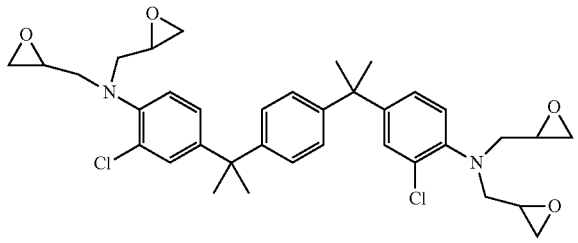

Such glycidyl amine epoxy resin of a structural Formula (III A) represented by:

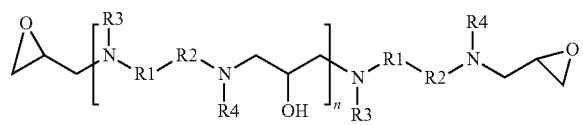

wherein R1, R2, R3, R4 independently can be hydrogen, alkyl, branched alkyl, aromatic, ortho substituted aromatic; Ar-aliphatic; substituted Ar Aliphatic, substituted aliphatic; and n is 1 to 20 wherein Formula (III A) is obtained by the reaction of the glycidyl amine epoxy resin of Formula (II) with diamine of Formula (I);

wherein Formula (I) is

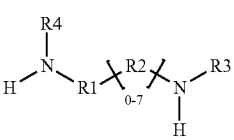

wherein the diamine of formula (I) has at least two amine group with at least 1 labile hydrogen on each nitrogen;

at least one nitrogen atom is directly attached to an aromatic ring on one side;

at least 1 amine group is hindered amine, either due to hindered aromatic ring having at least one substitution on ring at ortho position to carbon which is directly attached to amine group or due to branched aliphatic carbon directly attached to amine group;

at least one group out of R1, R2, R3 or R4 is independently hindered aromatic or branched aliphatic; substituted branched aliphatic;

R1, R2, R3, R4 independently can be hydrogen, alkyl, branched alkyl, aromatic, ortho substituted aromatic; Ar-aliphatic; substituted Ar Aliphatic, substituted aliphatic;

R1 and R4, or, R2 and R3 may be connected;

wherein diamine of Formula I is Ames negative.

Such glycidyl amine epoxy resin of a structural Formula (III B) represented by:

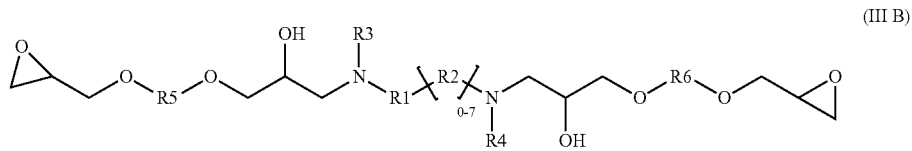

wherein Formula III B is a reaction product of the diamine of Formula (I) with a diglycidyl compound of Formula (IV) wherein R1, R2, R3, R4 independently can be hydrogen, alkyl, branched alkyl, aromatic, ortho substituted aromatic; Ar-aliphatic; substituted Ar Aliphatic, substituted aliphatic; and R5 and R6 can be same or different; R5 and R6 are independently, C1-14 branched aliphatic alkyl; C1-14 unbranched aliphatic alkyl, cycloaliphatic, aromatic, substituted aromatic.

Q and A can be independently C (=O) O, O, NH wherein diamine of Formula I is Ames negative.

Such glycidyl amine epoxy resin, wherein the diglycidyl compound of Formula (IV) is selected from the group comprising of a glycidyl ether of tetramethyl bisphenol F, a diglycidyl ether of ring-hydrogenated bisphenol A, a diglycidyl ether of ring-hydrogenated bisphenol F, a cresol glycidyl ether resin, and a novolac epoxy resin.

Such glycidyl amine epoxy resin, wherein the a diglycidyl compound of Formula (IV) is selected from the group comprising a diglycidyl ether of Formula (IVA) or a diglycidyl ester of Formula (IVB) represented by:

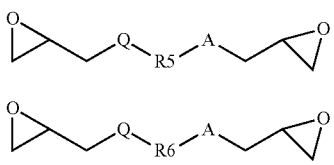

Formula (IVA)

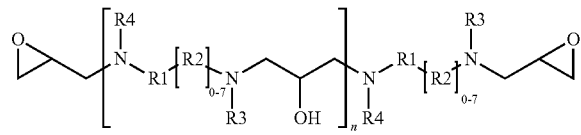

Formula (IVB)

wherein R5 and R6 can be same or different; R5 and R6 are independently, C1-14 branched aliphatic alkyl; C1-14 unbranched aliphatic alkyl, cycloaliphatic, aromatic, substituted aromatic.

Q and A can be independently C (═O) O, O, NH

A curable coating system comprising a reaction product of any one of epoxy resin of Formula (IIIA) and Formula (IIIB), cured with a hardener.

Such curable coating system, wherein the hardener is selected from the group consisting of an amino curing agent or an phenolic curing agent.

INDUSTRIAL APPLICABILITY

The glycidyl amine epoxy resins produced in accordance with the present disclosure are meant for safe use in civil, coating, electronic or composite applications. The glycidyl amine epoxy resins are synthesized from on AMES negative diamines and Bisphenol free precursors, which infuse safety at the time of product design stage. In recent past due to restriction on bisphenol-based resins for food contact application, need for safer substitutes has been felt and end customer need safe products. Such novel resin have potential to reduce regulatory pressures on one side and better acceptability and reduced approval time at customer end. These resins can be used to get resins of any desired molecular weight and can be useful for multiple applications including engineering polymers. The curable coating composition based on glycidyl amine epoxy resin of the present disclosure have comparable or superior performance in a number of critical coating performance characteristics, including corrosion resistance, application, with minimal environmental impact. Hence glycidyl amine epoxy resins based on AMES negative diamines of Formula (I) can have large positive commercial impact on business. The present application discloses glycidyl amine epoxy resins which may be made in a variety of molecular weights that suit for efficient application of the coating system to a metals substrate. Such resins meet basic performance criteria, e.g. no misting or blocking, suitable to achieve good compatibility with other copolymers or materials e.g. thermoplastic materials such as PVC that may be present in the coating system. The epoxy resins in accordance with the present disclosure provides coating compositions for food containers that are free from Bisphenol A diglycidyl ether (BPA) and Bisphenol F diglycidyl ether (BPF) and does not contain extractible quantities of such compounds. The coating composition of the present invention are suitable for use in food contact situations and can be used on the inside of such cans. This is particularly useful in the case of foods which would absorb and chemically alter metal coverings. The coating composition possesses desirable properties that are specially required as coating compositions for food containers. The desirable properties include a coating that does not contain bisphenol A or any other endocrine disruptor.

We claim:
1. A glycidyl amine epoxy resin of a structural Formula (III A) represented by:

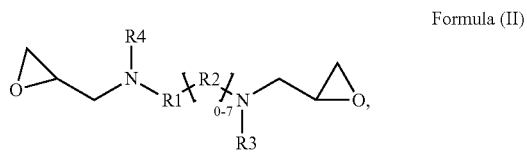

wherein n is 1 to 20,
wherein the glycidyl amine epoxy resin of Formula (III A) is obtained by a reaction of a glycidyl amine epoxy resin of Formula (II) with a diamine of Formula (I), wherein the glycidyl amine epoxy resin of Formula (II) is obtained by reaction of a diamine of Formula (I) with epichlorohydrin, wherein the structure of Formula (II) is represented by:

Formula (II)

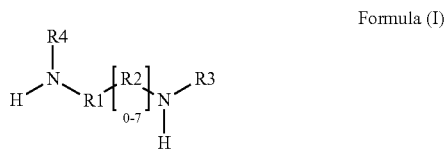

and
wherein the structure of the diamine of Formula (I) is represented by

Formula (I)

$$\underset{H}{\overset{R4}{N}}\text{—}R1\underset{0-7}{\left[\overset{R2}{\underset{}{}}\right]}\underset{H}{\overset{}{N}}\text{—}R3$$

wherein
the diamine of Formula (I) has at least two amine groups with at least one labile hydrogen on each nitrogen,
at least one nitrogen atom of the diamine of Formula (I) is directly attached to an aromatic ring on one side,
at least one amine group of the diamine of Formula (I) is a hindered amine, due to a hindered aromatic ring having at least one substitution on the ring at an ortho position to a carbon which is directly attached to the amine group,
each R1 and R2 of the diamine of Formula (I) is a divalent group independently selected from the group consisting of aromatic, ortho substituted aromatic, ar-aliphatic, substituted ar-aliphatic and substituted aliphatic;
each R3 and R4 of the diamine of Formula (I) is independently selected from the group consisting of hydrogen, aromatic, ortho substituted aromatic; ar-aliphatic; substituted ar-aliphatic, and substituted aliphatic,
at least one group out of R1, R2, R3 and R4 of the diamine of Formula (I) is independently a hindered aromatic, wherein the hindered aromatic is an ortho substituted aromatic,
R1 and R4, or, R2 and R3 may be connected;
wherein the diamine of Formula (I) is Ames negative.
2. The glycidyl amine epoxy resin as claimed in claim 1, wherein the diamine of structural Formula (I) is selected from the group consisting of a compound of Formula (VI) and a compound of Formula VII represented by:

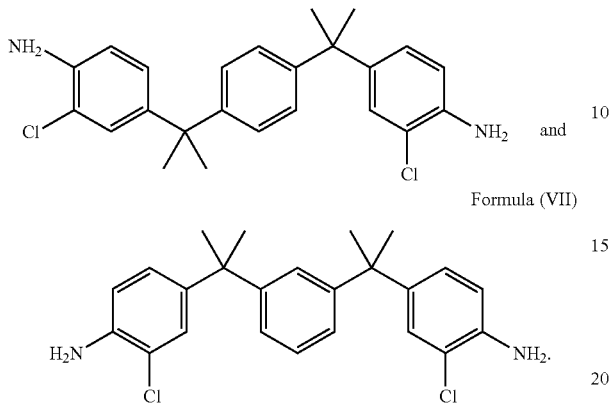

Formula (VI)

and

Formula (VII)

3. The glycidyl amine epoxy resin as claimed in claim 1, wherein the glycidyl amine epoxy resin of structural Formula (II) is selected from the group consisting of a glycidyl amine of Formula (X) and a glycidyl amine of Formula (XI) represented by:

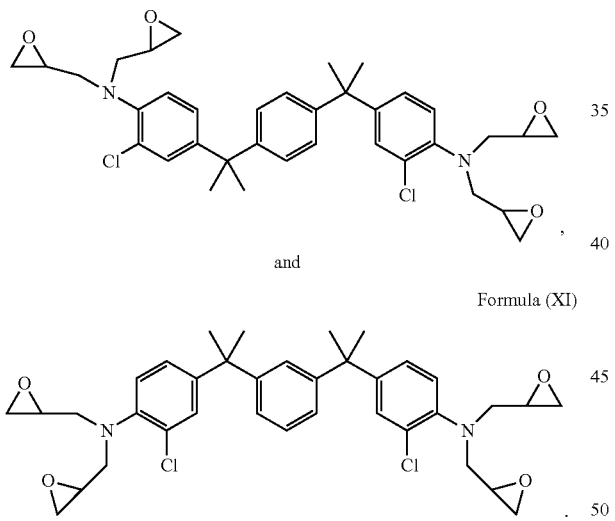

Formula (X)

and

Formula (XI)

4. A system comprising:
a coating system comprising
a reaction product of a glycidyl amine epoxy resin of Formula (III A) cured with a hardener, wherein Formula (III A) is represented by:

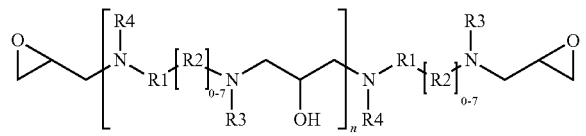

Formula (III A)

wherein n is 1 to 20,
wherein the glycidyl amine epoxy resin of Formula (III A) is obtained by a the reaction of a glycidyl amine epoxy resin of Formula (II) with a diamine of Formula (I),
wherein the glycidyl amine epoxy resin of Formula (II) is obtained by a reaction of a diamine of Formula (I) with epichlorohydrin, wherein the structure of Formula (II) is represented by:

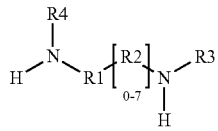

Formula (I)

and wherein the structure of the diamine of Formula (I) is represented by

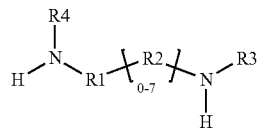

Formula (I)

wherein
the diamine of Formula (I) has at least two amine groups with at least one labile hydrogen on each nitrogen;
at least one nitrogen atom of the diamine of Formula (I) is directly attached to an aromatic ring on one side;
at least one amine group of the diamine of Formula (I) is a hindered amine due to a hindered aromatic ring having at least one substitution on the ring at an ortho position to a carbon which is directly attached to amine group;
each R1 and R2 of the diamine of Formula I is a divalent group independently selected from the group consisting of aromatic, ortho substituted aromatic, ar-aliphatic, substituted ar-aliphatic and substituted aliphatic;
each R3 and R4 of the diamine of Formula I is independently selected from the group consisting of hydrogen, aromatic, ortho substituted aromatic; ar-aliphatic; substituted ar-aliphatic, and substituted aliphatic;
at least one group out of R1, R2, R3 and R4 of the diamine of Formula I is independently a hindered aromatic, wherein the hindered aromatic is an ortho substituted aromatic;
R1 and R4, or, R2 and R3 can be connected; and
wherein the diamine of structural Formula (I) is AMES negative.

5. The system as claimed in claim 4, wherein the hardener is an amino curing agent or a phenolic curing agent.

6. The system as claimed in claim 4, wherein the diamine of structural Formula (I) is selected from the group consisting of a compound of Formula (VI) and a compound of Formula (VII) represented by:

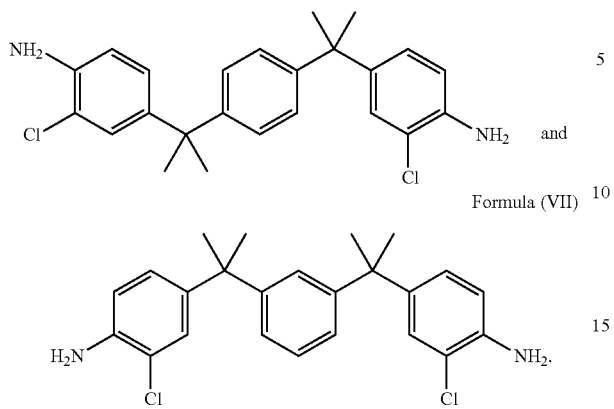
7. The system as claimed in claim 4, wherein the glycidyl amine epoxy resin of structural Formula (II) is selected from the group consisting of a glycidyl amine of Formula (X) and a glycidyl amine of Formula (XI) represented by: